United States Patent [19]

Leib et al.

[11] Patent Number: 5,704,746

[45] Date of Patent: Jan. 6, 1998

[54] PLASTIC FASTENER FOR THREADED BLIND APERTURE

[75] Inventors: William J. Leib, Elwood; Arnold DeCarlo, Manhattan, both of Ill.

[73] Assignee: Illinois Tool Works Inc., Glenview, Ill.

[21] Appl. No.: 791,644

[22] Filed: Jan. 30, 1997

[51] Int. Cl.$^6$ .................................................. F16B 13/04
[52] U.S. Cl. ................... 411/24; 411/54; 411/41; 411/60
[58] Field of Search .......................... 411/60, 54, 24, 411/40, 41, 72

[56] References Cited

U.S. PATENT DOCUMENTS

| | | | |
|---|---|---|---|
| 1,852,089 | 4/1932 | Pleister | 411/24 |
| 4,488,843 | 12/1984 | Achille | 411/60 |
| 4,856,950 | 8/1989 | Bushnell | 411/41 |
| 5,332,346 | 7/1994 | Shinjo | 411/54 |

FOREIGN PATENT DOCUMENTS

| | | | |
|---|---|---|---|
| 763704 | 7/1967 | Canada | 411/41 |
| 1558097 | 12/1979 | United Kingdom | 411/60 |

Primary Examiner—Flemming Saether
Attorney, Agent, or Firm—Kane,Dalsimer,Sullivan,Kurucz,Levy,Eisele and Richard, LLP

[57] ABSTRACT

The fastener, which is typically made of thermoformed or similar plastic, includes a shank portion at least two parallel fingers which further include a proximal end and a distal end. The proximal end of the fingers is integral with a base portion and the distal end of the fingers is integral with bridge elements which attach to a wedge element. A driving pin is attached to the base portion and is aligned with a gap formed between the at least two parallel fingers. The parallel fingers further include lateral serrated portions and radially oriented stabilizing fins. Upon impact to the driving pin when the fastener is placed into a blind threaded aperture, the wedge portion forces apart the distal ends of the parallel fingers, while the driving pin forces apart the proximal ends of the parallel fingers thereby driving the serrated portions of the fingers against the threads of the blind threaded aperture.

16 Claims, 3 Drawing Sheets

PLASTIC FASTENER FOR THREADED BLIND APERTURE

BACKGROUND OF THE INVENTION

1. Field of the Invention

This invention pertains to fastener which is made from plastic and is particularly adapted for use in a threaded blind aperture. The shank of the fastener includes two lateral parallel fingers which are driven apart and into position by a bottom wedge and a top pin.

2. Description of the Prior Art

In the prior art, metallic fasteners and rivets have been used to secure components to planar elements. In particular, these devices have passed through aligned apertures in both the components and the planar elements. However, these devices have been somewhat difficult to install as they have required prolonged tooling processes, such as the insertion of a screw, for proper installation. Similarly, as these devices have most frequently been metallic, they have been expensive to manufacture.

Examples of the prior art include U.S. Pat. No. 4,610,587 to Wollar et al., entitled "Reusable Two-Piece Fastener" and U.S. Pat. No. 2,941,439 to Rapata entitled "Rivet and Integral Expander Pin Connected Thereto by Area of Limited Cross Section".

The Wollar et al. reference describes a fastener which includes a metallic screw which is rotatably inserted into a plastic body member with radially expandable and retractable legs which engage an aperture within a panel. This apparatus requires a manufacturing process involving metal working and an installation process involving the installation of a screw with a screwdriver which can be time-consuming.

The Rapata reference, while providing a plastic fastener, has a shank which is enlarged only by a drive pin entering from the head portion and therefore has been difficult to position properly.

OBJECTS AND SUMMARY OF THE INVENTION

It is therefore an object of this invention to provide a fastener which is simple to install, with a minimum of time and tools required.

It is therefore a further object of this invention to provide a fastener which is simple and inexpensive to manufacture, preferably with a minimum of metallic parts required.

It is therefore a still further object of this invention to provide a fastener which positions or centers itself within an aperture, particularly a blind threaded aperture.

It is therefore a final object of this invention to provide a fastener which is expanded by elements at both ends of the shank which engages the aperture.

These and other objects are achieved by providing a plastic fastener with a shank with two lateral parallel fingers with proximal ends extending from the base of the plastic fastener. The sides of the fingers include serrated segments. The distal ends of the parallel fingers are separated by a wedge structure which is secured to the distal ends of each parallel finger by bridges of reduced thickness. The fingers further include radially extending centering fins to position the fastener within the blind threaded aperture.

The base portion of the fastener includes a drive pin which is positioned above the gap formed between the two parallel fingers. The area of the base portion which is immediately above the gap between the two parallel fingers and which supports the drive pin is of reduced thickness. Two diagonally opposite corners of the drive pin have a groove-like section which corresponds to ridge-type sections immediately therebelow on the fingers. This serves to align the drive pin properly when the drive pin is inserted between the two fingers.

To use the fastener, the shank of the fastener is inserted into a blind threaded aperture and the drive pin is struck with a sudden force, such as by a hammer. The impact of the fastener against the blind portion or bottom of the aperture drives the wedge between the two fingers driving the fingers apart so that the serrated segments of the fingers engage the threads of the aperture. Immediately thereafter, the area of reduced thickness in the base portion breaks allowing the drive pin to be forced between the two fingers further driving the fingers apart.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figures 1, 2:
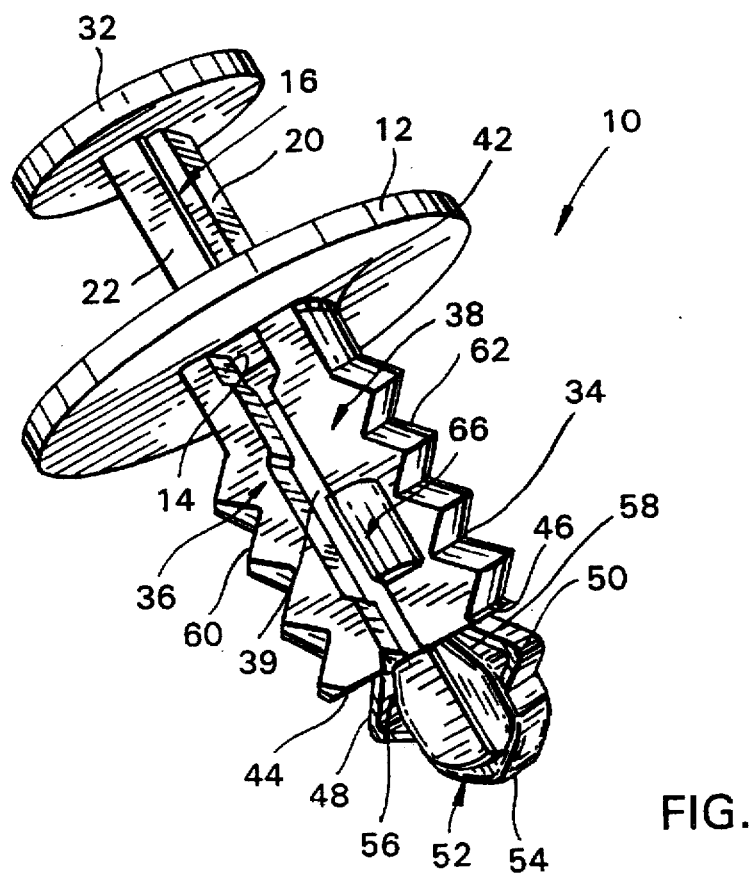
FIG. 1 is a perspective view of the fastener of the present invention.
FIG. 2 is a side plan view, partially in phantom, of the fastener of the present invention, above the threaded portion of a finger of the fastener.
Figure 3:
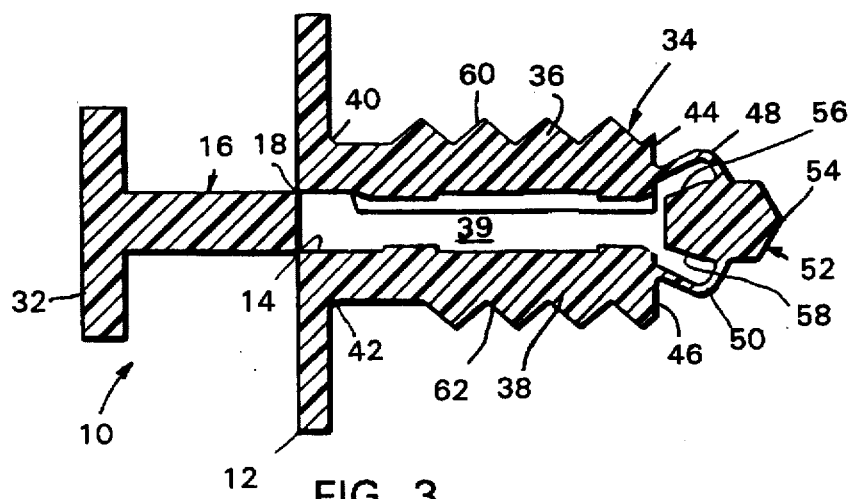
FIG. 3 is side cross-sectional view of the fastener of the present invention, along section 3—3 of FIG. 2, showing both fingers and the gap therebetween.

Referring now to the drawings in detail wherein like numerals refer to like elements throughout the several views, one sees that FIG. 1 is a perspective view of the fastener 10 of the present invention while FIG. 3 is a cross-sectional view of the fastener 10 of the present invention.

Fastener 10 is typically made of a single integral piece of injection molded or similar plastic.

Figure 5:
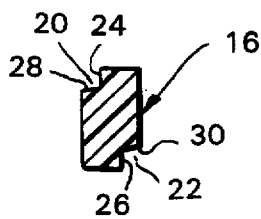
FIG. 5 is a cross-sectional view of the drive pin of the present invention, along section 5—5 of FIG. 4.

As can be seen in FIGS. 1 and 3, fastener 10 includes circular disk-like base 12. The center of base 12 includes a portion of reduced or substantially eliminated surface 14 over which drive pin 16 is formed. Prior to installation of fastener 10, drive pin 16 is integral with base 12 by a way of a minimal bridge 18. As shown in FIG. 5, drive pin 16 has a substantially rectangular cross section with grooves 20, 22 formed on two opposite corners. Grooves 20, 22 are formed from vertical walls 24, 26 and near-horizontal walls 28, 30, respectively. Near-horizontal walls 28, 30 are inclined from the horizontal by approximately ten degrees in a direction so as to widen grooves 20, 22.

Drive pin 16 further includes disk-like head 32 which receives a sudden impact, such as from a hammer, during the installation process.

As further shown in FIGS. 1 and 3, fastener 10 includes a shank 34 formed by two parallel fingers 36, 38 with gap 39 therebetween. Parallel fingers 36, 38 extend from proximal ends 40, 42 which are integral with the base 12 to distal ends 44, 46 which include bridges 48, 50, respectively, which engage lateral sides of wedge 52.

Figure 8:
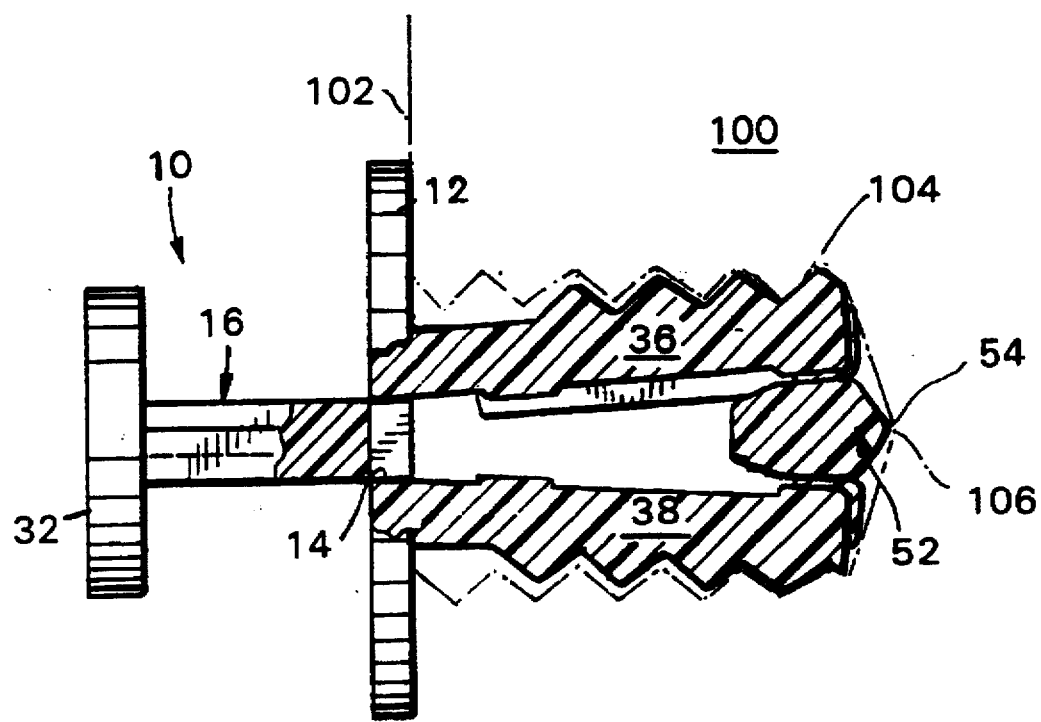
FIG. 8 is a cross-sectional view of the fastener of the present invention, showing the wedge inserted between the two fingers during the installation process.
Figure 9:
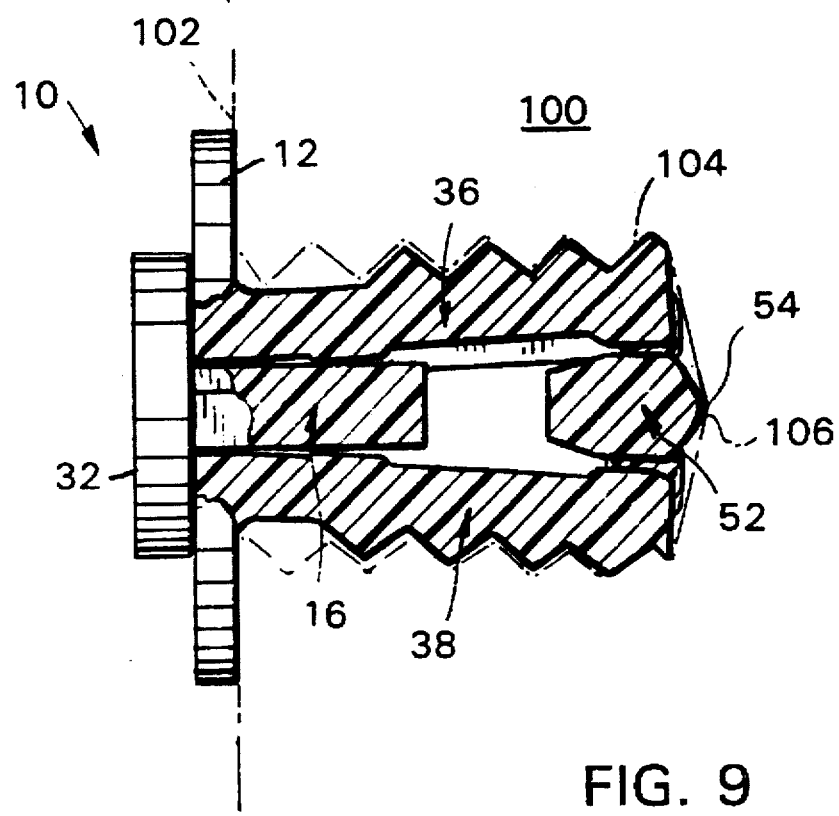
FIG. 9 is a cross-sectional view of the fastener of the present invention in its fully installed state, with both the wedge and drive pin inserted between the two fingers, and the two fingers engaging the threads of a threaded blind aperture.

Point 54 is formed on the outward surface of wedge 52 while inclined walls 56, 58 are formed on the inward surface of wedge 52, oriented toward gap 39 between fingers 36, 38. Point 54 permits wedge 52 to center fastener 10 when blind threaded aperture 104 includes a central concave point at blind end 106 as shown in FIGS. 8 and 9. Inclined walls 56, 58 allow wedge 52 to be guided into gap 39 during the installation of fastener 10 thereby forcing fingers 36, 38 apart.

Figure 4:
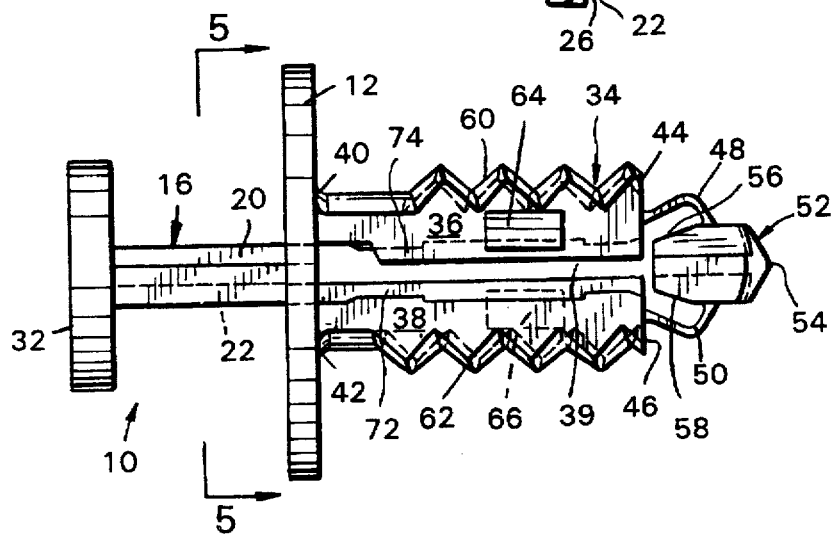
FIG. 4 is a side plan view, partially in phantom, of the fastener of the present invention, showing both fingers and the gap therebetween.
Figure 6:
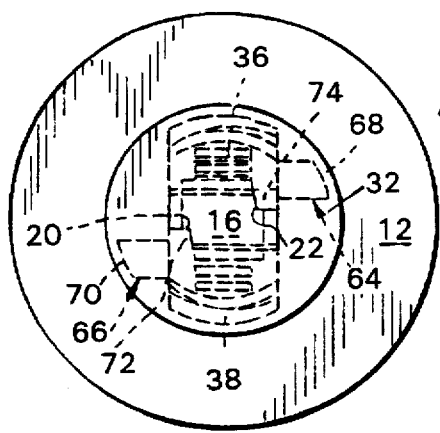
FIG. 6 is a top plan view, partially in phantom, of the fastener of the present invention.
Figure 7:
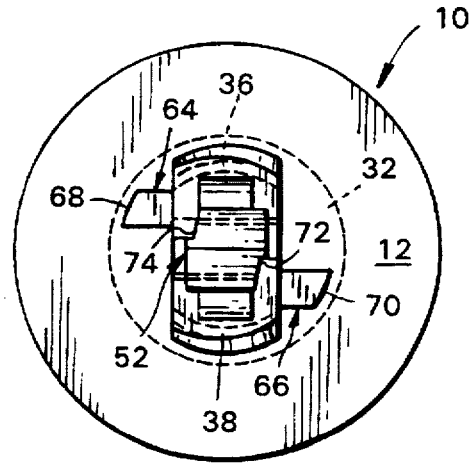
FIG. 7 is a bottom plan view, partially in phantom, of the fastener of the present invention.

As shown in FIGS. 3 and 4, the outward lateral surfaces of fingers 36, 38 include partially threaded portions or serrations 60, 62, respectively. As can be seen in FIGS. 8 and 9, these partially threaded portions or serrations 60, 62 are designed to engage threads of a blind threaded aperture 104. Blind threaded aperture 104 is formed from planar surface 102 on element 100.

As further shown in FIGS. 8 and 9, base 12 is designed to engage the surface 102 of element 100 into which threaded blind aperture 104 is formed.

As shown in FIGS. 2, 4, 6, and 7, fingers 36, 38 include radially extending centering fins 64, 66, respectively, at a central location thereof. Radially extending centering fins 64, 66 include circumferential rounded oblique walls 68, 70, respectively. The circumferential rounded oblique walls 68, 70 of radially extending centering fins 64, 66 engage the walls of blind threaded aperture 104 in order to center fastener 10 during the installation process.

As shown in FIGS. 3, 4, 6 and 7, fingers 36, 38 include ridges 72, 74 aligned immediately under notches 22, 20, respectively of drive pin 16. This serves to align the drive pin 16 between fingers 36, 38 when drive pin 16 is inserted therebetween as shown in FIG. 9.

As shown in FIGS. 8 and 9, to install fastener 10, the user places fingers 36, 38 of shank 34 of fastener 10 into blind threaded aperture 104 formed in element 100. Point 54 of wedge 52 abuts blind end 106 of blind threaded aperture 104. Base 12 extends somewhat from planar surface 102 prior to the insertion of wedge 52 between fingers 36, 38. The user strikes head 32 with a hammer or similar tool. This sudden impact drives wedge 52 which abuts blind end 106 between fingers 36, 38 thereby driving distal ends 44, 46 of fingers 36, 38 apart so that partially threaded portions or serrations 60, 62 engage the sides of blind threaded aperture 104 as shown in FIG. 8. While bridges 48, 50 can be designed to break during this impact, bridges 48, 50 are preferably designed to maintain the integral configuration between wedge 52 and fingers 36, 38. This preferable design of bridges 48, 50 allows wedge 52 to be driven between distal ends 44, 46 of fingers 36, 38 before drive pin 16 is driven between proximal ends 40, 42 thereby providing improved centering of fastener 10 within blind threaded aperture 104. The drive pin 16 then breaks from minimal bridge 18 of base 12 and is driven between proximal ends 40, 42 of fingers 36, 38 as shown in FIG. 9. Notches 22, 20 of drive pin 16 align with ridges 72, 74 of fingers 36, 38 thereby reducing or preventing rotation of drive pin 16 and assuring an accurate installation.

Fastener 10 is thereby installed with a minimum of time, effort or specialized tools.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A fastener for use in a blind threaded aperture, said fastener comprising:
   a base portion with a first side and a second side;
   a shank portion including at least two parallel fingers with a gap therebetween, each finger including a proximal end and a distal end, said proximal end of said at least two parallel fingers attached to said first side of said base portion;
   a wedge portion aligned with said gap and attached to said distal ends of said at least two parallel fingers by an attaching means, said attaching means being flexible to permit movement of said wedge portion along a longitudinal axis of said shank potion; and
   a driving pin attached to said second side of said base portion, said driving pin aligned with said gap.

2. The fastener of claim 1 wherein, in an installed position, said wedge portion is driven between said distal ends of said at least two parallel fingers, and said driving pin is driven between said proximal ends of said at least two parallel fingers.

3. The fastener of claim 2 wherein said at least two parallel fingers include at least partially serrated sides.

4. The fastener of claim 2 wherein said base portion is planar for aligning said base portion with a planar surface having said blind threaded aperture when said shank portion is inserted into the blind threaded aperture and said fastener is in the installed position.

5. The fastener of claim 2 wherein said driving pin includes a head portion which is subjected to a sudden impact to place said driving pin and said wedge into the installed position.

6. The fastener of claim 3 wherein said attaching means comprises bridge sections of reduced thickness.

7. The fastener of claim 6 wherein a portion of said base section between said driving pin and said gap is of reduced thickness.

8. The fastener of claim 6 wherein said wedge portion has inclined walls oriented toward said at least two parallel fingers.

9. The fastener of claim 6 wherein said wedge portion includes a point for engaging a blind end of said blind threaded aperture.

10. The fastener of claim 7 wherein said bridge sections and said portion of said base section are configured such that upon sudden impact to said drive pin, said wedge portion separates said distal ends of said at least two parallel fingers prior to said drive pin separating said proximal ends of said at least two parallel fingers.

11. The fastener of claim 10 wherein said at least two parallel fingers include radially extending stabilizing fins.

12. The fastener of claim 11 wherein said stabilizing fins include oblique outwardly extending walls.

13. The fastener of claim 11 wherein said driving pin includes at least one groove aligned with at least one notch on said at least two parallel fingers, and wherein, in the installed position, said at least one groove engages said at least one notch.

14. The fastener of claim 1 wherein said fastener is formed from plastic.

15. The fastener of claim 1 wherein said fastener is formed from thermoformed plastic.

16. The fastener of claim 15 wherein the fastener is formed from a single unitary piece.

* * * * *